(12) United States Patent
Grove et al.

(10) Patent No.: US 7,429,544 B2
(45) Date of Patent: Sep. 30, 2008

(54) COATED FACER

(75) Inventors: Dale A. Grove, Pataskala, OH (US); David R. Hartman, Granville, OH (US)

(73) Assignee: Owens Corning Intellectual Capital, LLC DE (US)

( * ) Notice: Subject to any disclaimer, the term of this patent is extended or adjusted under 35 U.S.C. 154(b) by 0 days.

(21) Appl. No.: 10/826,637

(22) Filed: Apr. 16, 2004

(65) Prior Publication Data

US 2005/0233657 A1   Oct. 20, 2005

(51) Int. Cl.
B32B 27/04 (2006.01)
B32B 13/02 (2006.01)
B32B 17/04 (2006.01)
D03D 9/00 (2006.01)

(52) U.S. Cl. ............... 442/2; 442/20; 442/29; 442/35; 442/42; 442/43; 442/44

(58) Field of Classification Search ...... 442/2, 442/20, 29, 35, 42, 43, 44
See application file for complete search history.

(56) References Cited

U.S. PATENT DOCUMENTS

| | | | |
|---|---|---|---|
| 4,394,414 A * | 7/1983 | Brown et al. ............ 442/331 |
| 4,681,798 A | 7/1987 | Gill et al. |
| 4,755,409 A * | 7/1988 | Harkness ............ 428/40.3 |
| 4,784,897 A | 11/1988 | Brands et al. |
| 5,001,005 A | 3/1991 | Blanpied |
| 5,112,678 A | 5/1992 | Gay et al. |
| 5,395,438 A * | 3/1995 | Baig et al. ............ 106/164.51 |
| 5,698,302 A | 12/1997 | Brandon et al. |
| 5,698,304 A | 12/1997 | Brandon et al. |
| 5,718,785 A | 2/1998 | Randall |
| 5,735,092 A | 4/1998 | Clayton et al. |
| 5,772,846 A | 6/1998 | Jaffee |
| 5,791,109 A | 8/1998 | Lehnert et al. |
| 5,883,024 A | 3/1999 | O'Haver-Smith et al. |
| 5,891,563 A | 4/1999 | Letts |
| 5,981,406 A | 11/1999 | Randall |
| 6,001,496 A | 12/1999 | O'Haver-Smith |
| 6,030,559 A | 2/2000 | Barry et al. |
| RE36,674 E | 4/2000 | Gluck et al. |
| 6,044,604 A | 4/2000 | Clayton et al. |
| 6,176,920 B1 * | 1/2001 | Murphy et al. ............ 106/711 |
| 6,187,697 B1 | 2/2001 | Jaffee et al. |
| 6,206,669 B1 | 3/2001 | Lewit et al. |
| 6,365,533 B1 | 4/2002 | Horner, Jr. et al. |
| 6,770,354 B2 | 8/2004 | Randall et al. |
| 2002/0090871 A1 | 7/2002 | Ritchie et al. |
| 2002/0151240 A1 * | 10/2002 | Smith et al. ............ 442/327 |
| 2003/0129903 A1 | 7/2003 | Moes |
| 2003/0175478 A1 | 9/2003 | Leclercq |
| 2003/0203191 A1 * | 10/2003 | Randall et al. ............ 428/341 |
| 2005/0009428 A1 * | 1/2005 | Porter et al. ............ 442/129 |
| 2005/0202742 A1 * | 9/2005 | Smith et al. ............ 442/256 |

FOREIGN PATENT DOCUMENTS

| | | |
|---|---|---|
| EP | 1 016 757 | 7/2000 |
| EP | 1 283 299 | 2/2003 |
| EP | 1 431 068 | 6/2004 |

* cited by examiner

Primary Examiner—Ula C Ruddock
(74) Attorney, Agent, or Firm—Margaret S. Millikin; James J. Dottavio

(57) ABSTRACT

A gypsum or foam facer is formed by the direct in-line or off-line coating of a pre-impregnated, fibrous network matting with a secondary binder system. The pre-impregnated fibrous network is preferably formed of a randomly oriented wet use chop strand fiber material impregnated with a modified urea-formaldehyde binder system. The secondary binder system preferably consists of low glass transition acrylic or styrene-butadiene-rubber resin filled predominantly with fillers combined with a plate like reinforcement or fibrous reinforcement. In an alternative embodiment, a low basis secondary veil is layered onto the fibrous network matting with or without the secondary binder system to improve softness and decorative appearance of the formed gypsum board. In another preferred alternative embodiment, a plurality of high aspect ratio particles may be introduced to the binder prior to introduction of an optional secondary binder resin to also improve the softness and decorative appearance of gypsum board.

39 Claims, 6 Drawing Sheets

COATED FACER

TECHNICAL FIELD AND INDUSTRIAL APPLICABILITY OF THE INVENTION

The present invention relates generally to coated facers, particularly facers for construction boards, and more specifically to gypsum or foam faced construction boards.

BACKGROUND OF THE INVENTION

Interior and exterior construction boards with cores of plaster, cement, or hybrid materials, such as cement boards or gypsum boards, are used in a wide variety of indoor and outdoor structural applications. For example, fairly recent gypsum/cement boards are used as a support surface for overlying materials such as wood siding, stucco, aluminum, brick, tile, stone aggregate, and marble. Also, gypsum/cement boards are used in exterior insulating systems, commercial roof deck systems, masonry applications and exterior curtain walls.

Generally, gypsum boards contain a core formed of a gypsum material and low-density fillers that are interposed between two facing layers. Known methods for making gypsum boards consists of providing a continuous feed of facing material and depositing a gypsum slurry onto the bottom surface of the facing material. A second continuous feed of facing material is then applied to the top surface of the slurry. The slurry is dried to harden the gypsum composition and to integrate the facing material into the cement board. The gypsum board is subsequently cut to a predetermined length for shipping and eventual use.

Facing materials advantageously contribute flexural, nail pull resistance, and impact strength to the high compressive strength but elongationally brittle material forming the cementitious core. In addition, the facing material can provide a durable surface and/or other desirable properties to the gypsum board.

Although paper sheets have long been used as the facing material for gypsum boards, facing materials formed of a fibrous mat have enjoyed a substantial increase in popularity. Glass fiber facings provide increased dimensional stability in the presence of moisture, biological resistance, and greater physical and mechanical properties than normal gypsum boards. These facing sheets are formed as randomly oriented, fibrous glass mats.

Fibrous non-woven mats or fabrics have found particular utility where the dimensional stability, fire resistance, biological resistance, nail-pull resistance, and flexural strength inherent in such materials are combined with a continuous, soft-touch coating.

Typical coated fibrous mats, as described above, offer many advantages over non-coated mats but have disadvantages as well. For example, off-line coated formulations are not as cost effective as direct wet formed mat products.

It is therefore highly desirable to provide a universal coating for a gypsum facer that can be used in a wide variety of gypsum board applications, from decorative to purely functional gypsum boards. It is also highly desirable to provide a gypsum facer that is cost effective.

SUMMARY OF THE INVENTION

The present invention is directed to a closed mat facing material, or gypsum facing material, formed by the direct in-line or off-line coating of a pre-impregnated, fibrous network matting with a secondary binder.

The secondary binder system preferably consists of low glass transition acrylic or styrene-butadiene-rubber (SBR) organic resin filled predominantly with a primary filler combined with a plate like reinforcement or fibrous reinforcement. If a firmer, more durable coating is desired, a small amount of crosslinking agent or thermosetting resin may be added to the low glass transition resins. An inorganic binder material may also be utilized in conjunction with organic resin. Primary fillers include calcium carbonate, aluminum hydroxide (ATH), zinc oxide, mixed oxides, iron oxides, chromates, glass beads, silicates, clay, and sand. The reinforcing agents, preferably in fibrous form, include wollastonite, wood fibers, cellulose, and lignin. The binder system may optionally incorporate a foaming agent to reduce coating density.

The formation of the gypsum facer according to the present invention runs at fairly high process rates and is cost effective for a high volume commodity. The secondary binder is flexible in that it can be used with a wide variety of mat inputs.

In one alternate preferred embodiment, a secondary veil material is added to the open mesh filament network to improve the softness of the formed gypsum facer. The secondary veil material allows modest gypsum penetration to form the gypsum boards.

In another alternative preferred embodiment, a plurality of fairly large aspect particles, like large wollastonite, wood based fibers, and polymeric fibers, are introduced to the primary resin and locked into place using a secondary binder resin.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

FIGS. 1, 2A and 2B, and 4A and 4B illustrate processing lines used to form a gypsum facing materials according to three preferred embodiments of the present invention.

Figure 1:
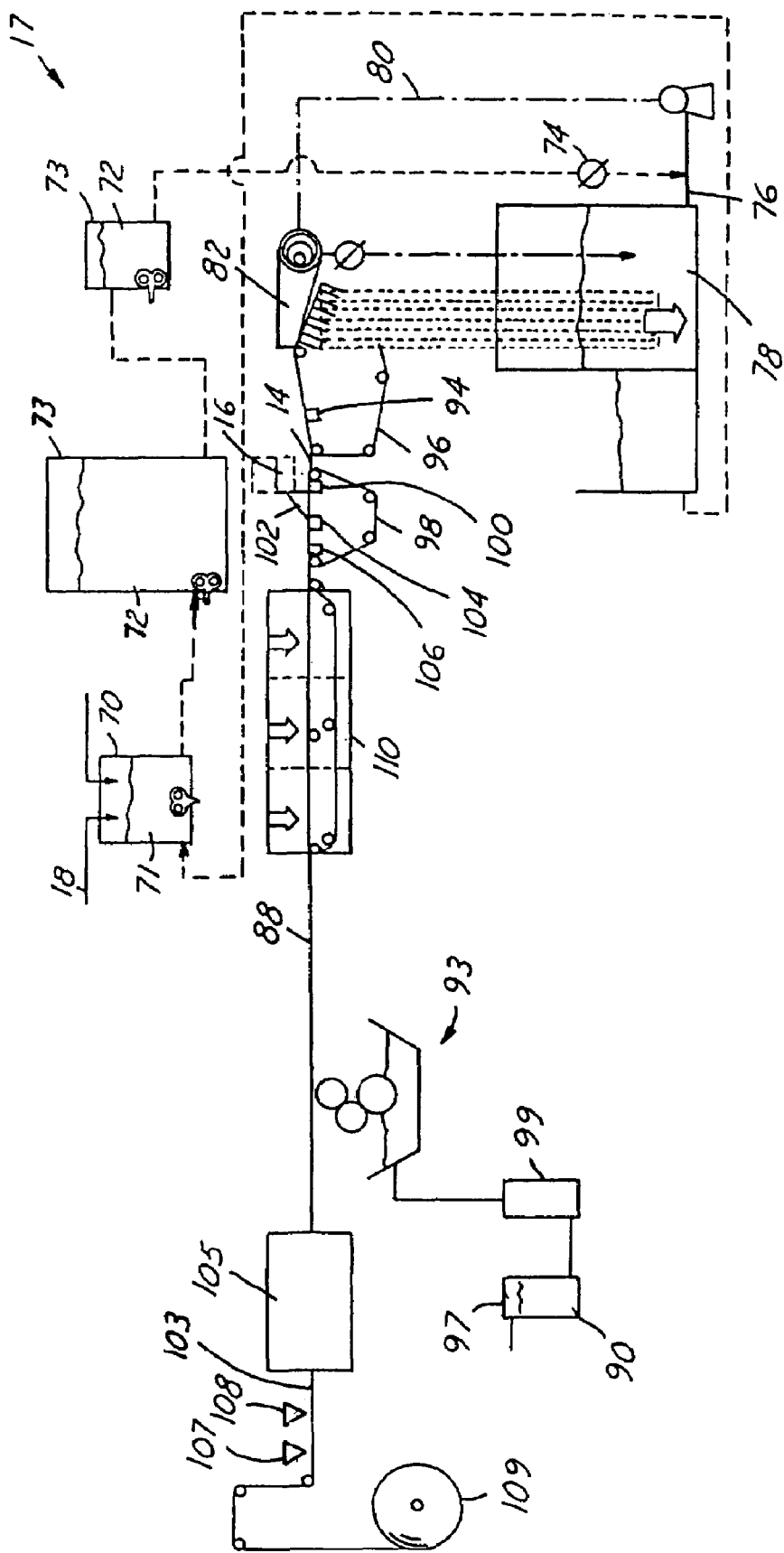
FIG. 1 is a perspective view of a processing line used to form a gypsum facing material according to one preferred embodiment of the present invention.

The gypsum facing material 103 of FIG. 1 is formed by impregnating a randomly oriented filament network 14 of wet use chop strands 18 with an inexpensive binder 16 and with a secondary binder resin 90 to form a gypsum facing material 103.

Figure 2A:
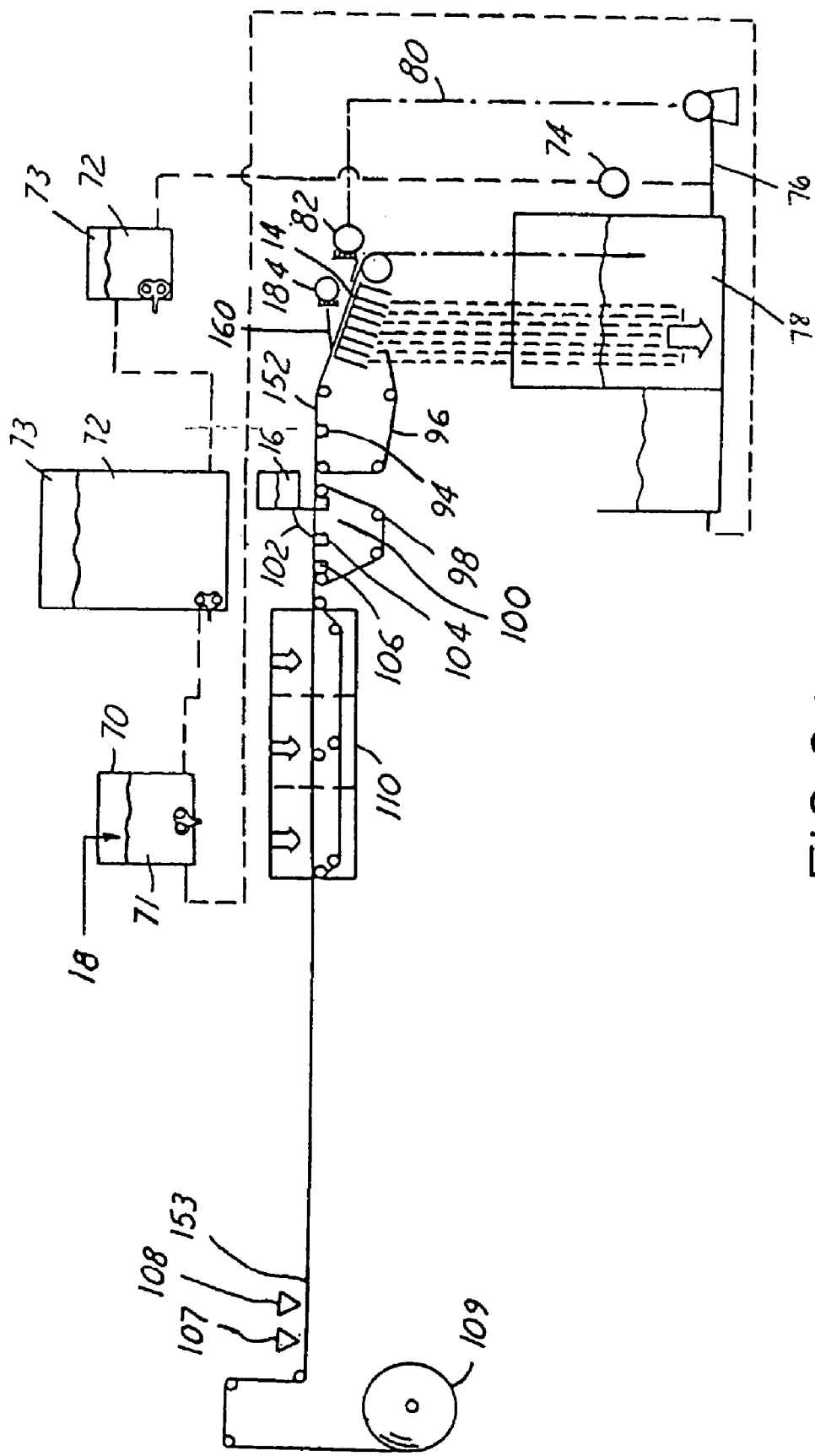
FIGS. 2A and 2B are a perspective views of a processing line used to form a gypsum facing material according to another preferred embodiment of the present invention.
Figure 2B:
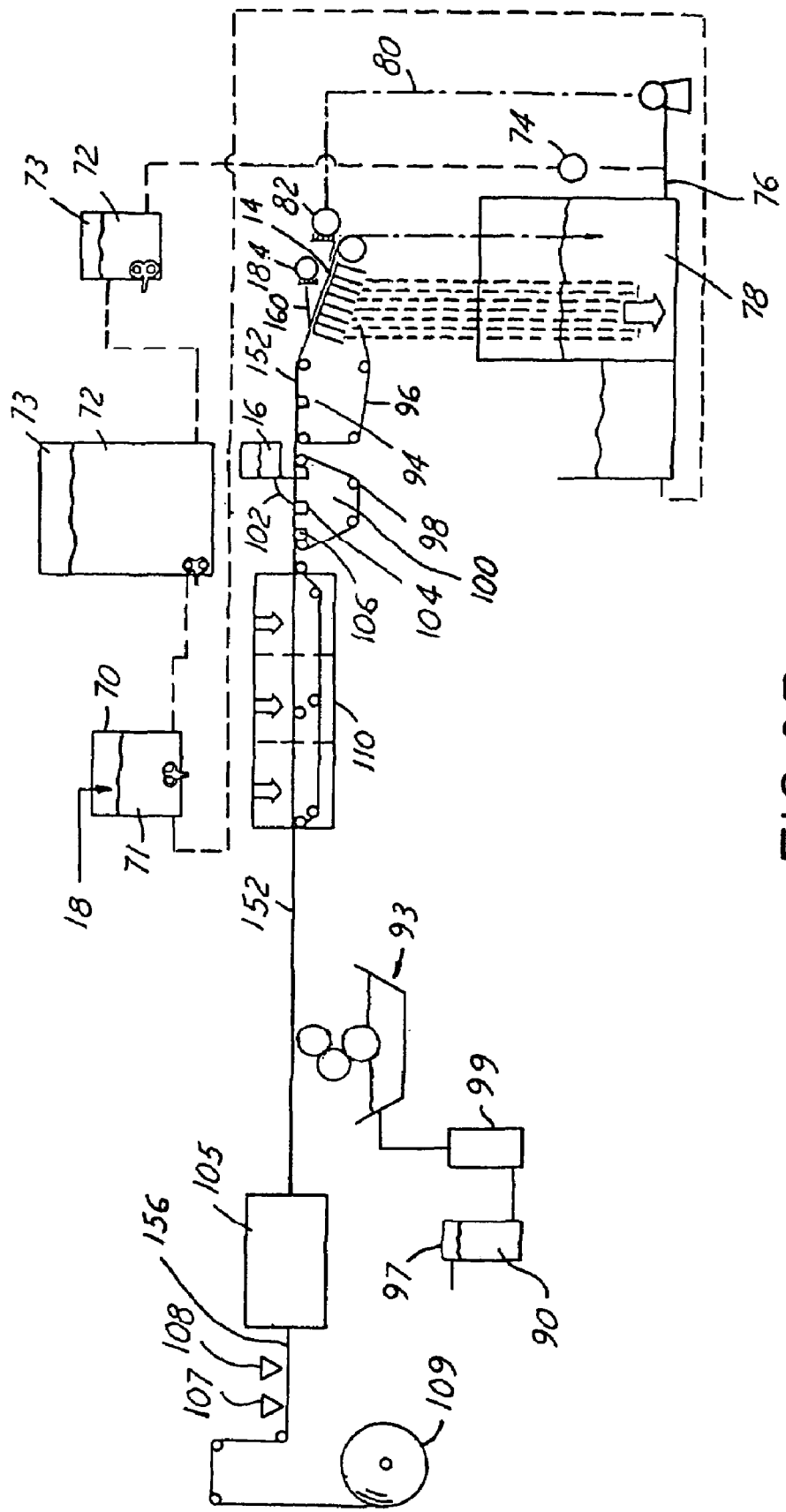

The gypsum facing material 153 of FIG. 2A is formed by additionally introducing a low basis secondary veil 160 to the network 14 to form a mat 152 that is subsequently impregnated with the inexpensive binder 16 to form the facing material 153. As shown in FIG. 2B, the gypsum facing material 153 may optionally be coated with a secondary binder resin 90 to form a gypsum facing material 156.

Figure 4A:
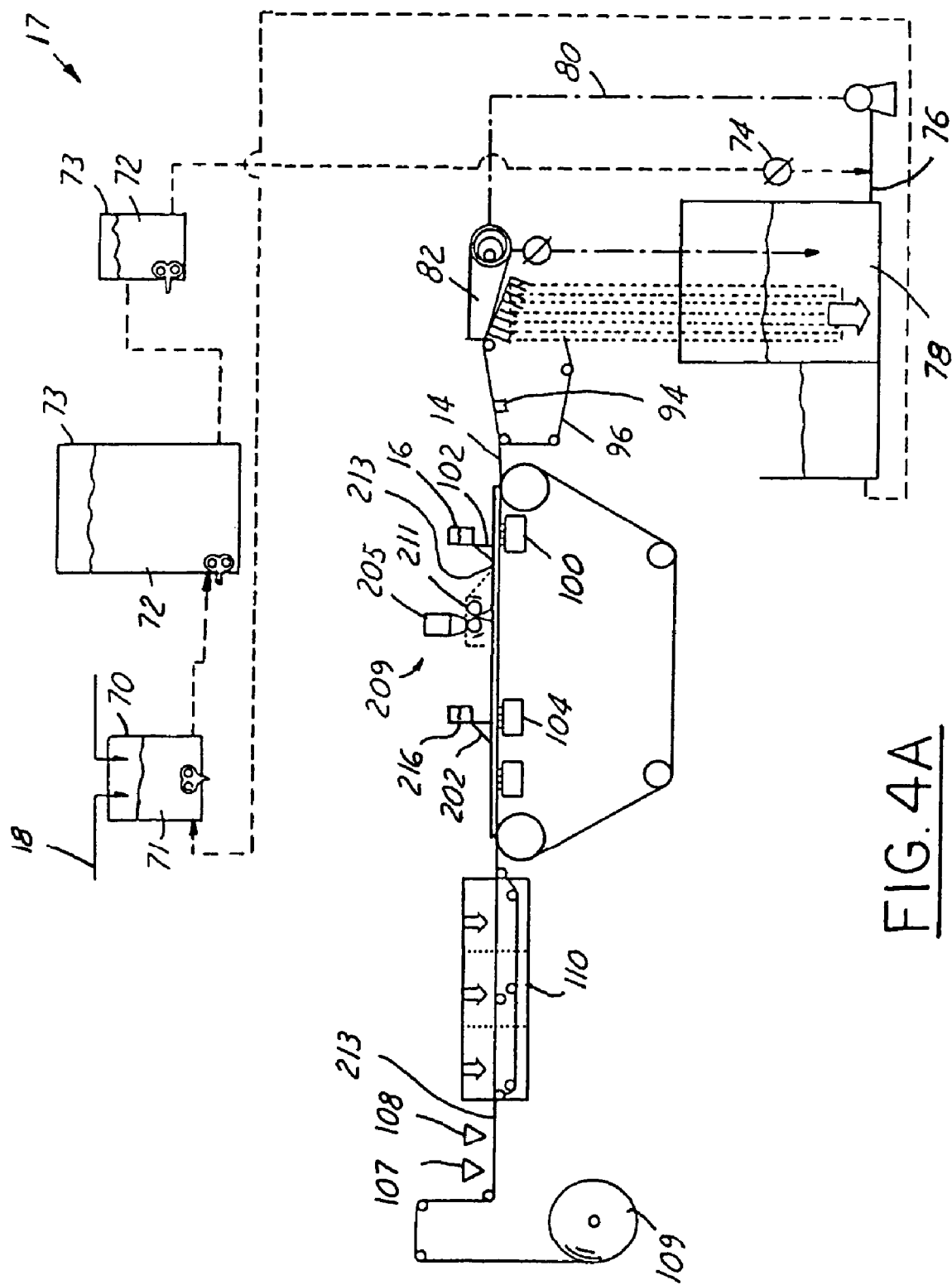
FIGS. 4A and 4B are perspective views of a processing line used to form a gypsum facing material according to another preferred embodiment of the present invention.
Figure 4B:
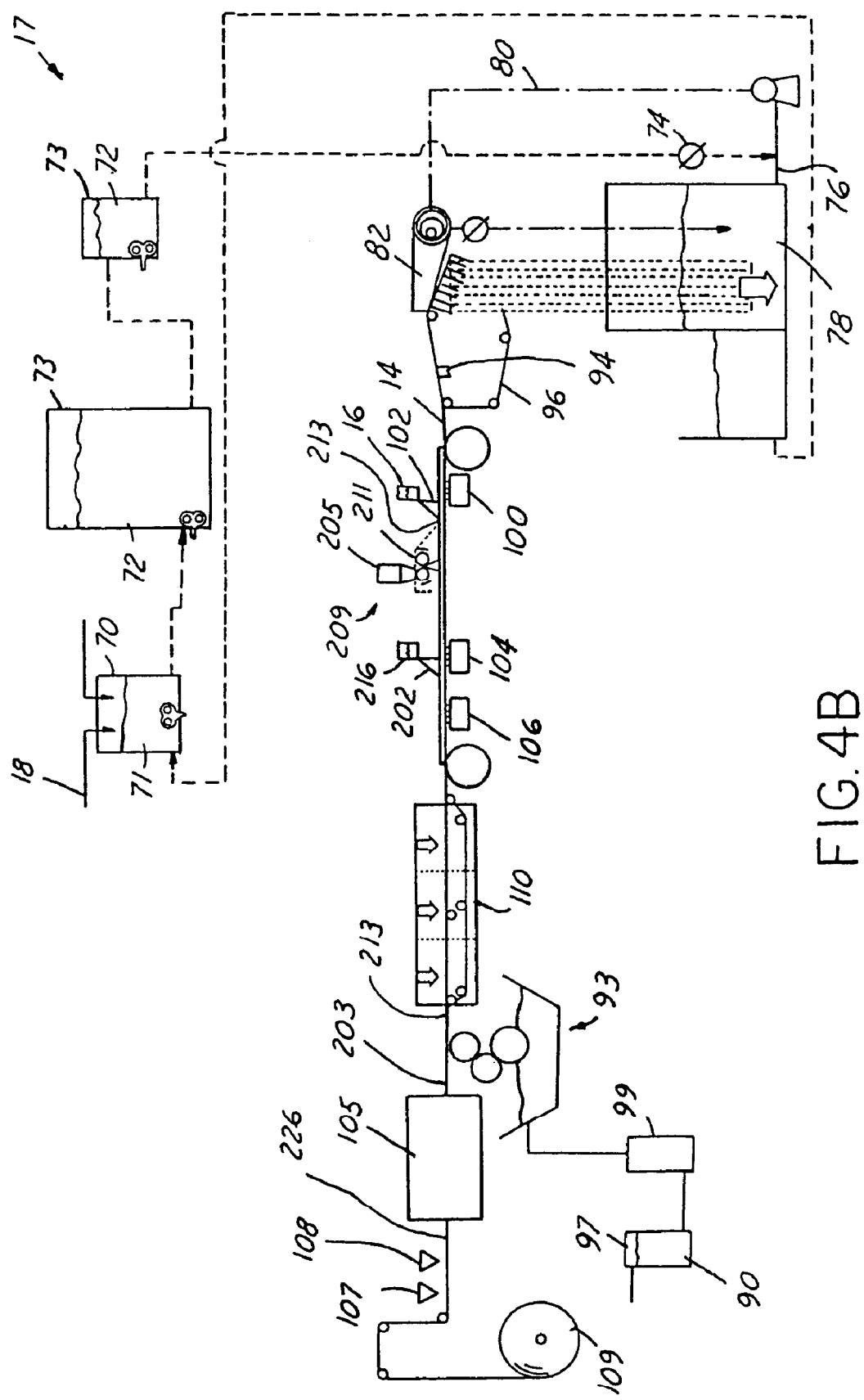

The low cost, flexible gypsum facing material 213 of FIG. 4A is formed by introducing a plurality of mica or fibrous particles 205 to the binder 16 of FIG. 1 to form a low cost, flexible gypsum facing material 213. As shown in FIG. 4B, the gypsum facing material 213 may optionally be coated with a secondary binder resin 90 to form a gypsum facing material 226.

The process for forming the gypsum facing material 103, 153, 156, 213, and 226 in accordance with these embodiments is described further below. These gypsum facing materials, in turn, may be immersed and embedded with a gypsum slurry to form a gypsum board, foam, or other building material having improved decorative characteristics and mechanical properties.

As used in the present application, the term "gypsum facing material", or "facing material", may be used interchangeably with the term "pre-impregnated bound veil". The term "pre-impregnated bound veil" is used to describe the mat prior to the application of the secondary, single sided coating.

FIG. 1 illustrates a processing line 17 used for forming the random filament network 14 and further forming a gypsum facing material 103. A whitewater chemical dispersion 71 is used to obtain reasonable filamentation of a plurality glass strands, preferably wet use chop strands 18, through steric, thermodynamic, and colloidal charge interactions. A preferred whitewater dispersion 71 includes a cationic dispersant, an anionic viscosity modifier, a defoamer and a biocide. The pH of the whitewater chemical dispersion 71 is preferably maintained at approximately 7-8.5. Alkalinity, if desired, is obtained by preferably adding ammonia. To take advantage of charge differences between the additives, the cationic dispersant is typically added first, followed by the strands 18, defoamer, and anionic viscosity modifier downstream to form the dispersion 72. Additives such as dry strength agents and wet strength agents known in the art may also be added to the dispersion 71.

The wet use chop strands 18 preferably utilize a low solids sizing composition to improve their dispersive characteristics and to minimize interfilament abrasion. The wet use strands 18, in the finished product, remain in a moist state having moisture contents running between 10 and 25%. One preferred wet use chop strand 18 having a low solids sizing that meets these requirements is Owens Corning's 9501 Advantex® glass filaments.

While wet use chop strands 18 are preferred for as the strands for use in the network 14, other types of filamentized glass reinforcing fibers may be utilized, as one of ordinary skill in the art appreciates. Further, blends of other types of glass fibers for use with the wet use chop strands 18 may also be utilized.

The anionic viscosity modifiers used in the whitewater dispersion 71 preferably have molar anionicities between approximately 25 and 40% and molecular weights of about 14-20 million. One preferred class of anionic viscosity modifiers is a polyacrylamide viscosity modifier such as Nalco 7768, Magnifloc 1885A, and HyChem AE 874. However, other possible viscosity modifiers or flocculants that may be used include hydroxyethyl cellulose and polyamines.

Preferably, the cationic dispersants used comprise ethoxylated alkylamine dispersants such as Nalco 8493, Schercopol DS-140, and Rhodameen VP532. However, other dispersants may be used as well, including amine oxides and polyethoxylated derivatives of amide condensation of fatty acid products. Also, preferred defoamers include Nalco PP04-3840 and Nopco NXZ.

The thick slurry 72 formed is maintained under agitation in a single tank 73 or series of tanks. The thick slurry 72 is then delivered through a control valve 74 and combined with a thin stock stream 76 from a silo 78 to form a lower consistency slurry 80 in the former 82. The thin stock stream 76 preferably comprises the same whitewater chemicals as the thick slurry 72 with lower fiber concentration. The ratio of thick slurry 72 to the silo stream 78 in the lower consistency slurry 80 should not exceed 1:20 to obtain good mixing characteristics.

The former 82 functions to equally distribute and randomly align the strands 18 to form the open mesh filament network 14. Formers 82 that can accommodate the initial fiber formation include Fourdrinier machines, Stevens Former, Roto Former, Inver Former, cylinder, and VertiFormer machines. These formers offer several control mechanisms to control fiber orientation within the network 14 such as drop leg and various pond regulator/wall adjustments. Such devices are known to one skilled in the art and not described in great detail.

Deposited fibers forming the network 14 are partially dried over a suction box 94 to exhibit correct release characteristics from the former wire 96 to the saturator section 98. Preferably, the network 14 is guided from the former 82 to the saturator section 98 through a transfer device.

Upon entering the saturator section 98, the network 14 is further dried with a first suction box 100. A binder 16 is then poured onto the network 14 from a curtain coater 102 or similar depositing device. The binder 16 coats and is pulled through the network 14 using a second suction box 104.

The binder 16 can be selected from many resin types commonly used in fibrous mats which include melamine-based, urea-formaldehyde-based, acrylic based, polyvinyl acrylates, or hybrid resins that make stable emulsions in water. Preferably, the binder 16 is a standard or modified urea-formaldehyde.

Referring back to FIG. 1, an additional suction box 106 is employed to control the binder basis weight. Ideally, binder basis weight level is measured at the end of the line 17 using a binder basis-gauging device 108. The network 14 is subsequently dried and cured in a dryer 110 such as a through-air dryer or honeycomb dryer to form a wet formed permeable precursor mat 88.

At this point, the finished precursor mat 88 could be either coated off-line or in-line to form a gypsum facing material 103. If in-line coating is utilized, as shown further in FIG. 1, a secondary coating 90 from a storage tank 97 coupled to a feed tank 99 is applied to the precursor mat 88 using a coating device 93. The coating device 93 of FIG. 1 is shown as having a reverse roll coater or meniscus coater, preferably combined with a knife or smoothening bar.

If an off-line coating is preferred (not shown), for instance wherein the coating is added at a customer site, the precursor mat 88 is simply wound onto a roll for storage and shipment. The mat 88 is then processed in a similar manner as described above in the previous paragraph on a separate manufacturing line.

The secondary coating 90 preferably consists of a fairly low glass transition (Tg) organic binder, normally either acrylic or styrene-butadiene-rubber (SBR) based, combined with fillers, and reinforcing agents, preferably in fibrous form, to enhance the strength of the coating. By definition, for the purposes of this invention, a fairly low glass transition temperature has a glass transition temperature in the range of 30 to −3020 C. If a firmer coat is desired, a small level of crosslinking agent or a small amount of a thermosetting resin may be introduced to the secondary coating 90.

The viscosity of the secondary coating 90 must be such to preferably prevent full penetration of the secondary coating 90 to the mat 88. Ideally the secondary coating 90 should remain on only one side of the mat 88 such that the glass fibers are exposed to gypsum penetration and bonding. Optionally, such coating 90 may impregnate the mat, but in certain applications, this may not be desirable. The fairly low glass transition organic binder makes up at least about six percent (6%) by weight, and preferably between about 7-10% weight percent of the secondary binder 90. The amount may be increased indefinitely above 10%, but the preferred performance/cost formulations have been found between 7-10%, while maintaining acceptable performance.

In an alternative embodiment, the principles of the current invention may be used in combination with a second inorganic binder, as described in U.S. Pat. No. 5,112,678 ('678 patent), which is incorporated herein by reference. In this embodiment, a lower percentage of the organic binder may be used in combination with an inorganic binder, as described in the '678 patent, but which also includes a reinforcing agent as described herein. Examples of inorganic binders which are used in the coatings are, but are not limited to the following: calcium oxide, calcium silicate, calcium sulfate, magnesium oxychloride, magnesium oxysulfate, and other compounds of some Group IIA elements (alkaline earth metals), as well as aluminum hydroxide. One example of such a complex inorganic binder is Portland cement, which is a mixture of various calcium-aluminum silicates.

Primary fillers include calcium carbonate, aluminum hydroxide (ATH), zinc oxide, mixed oxides, iron oxides, chromates, glass beads, silicates, clay, Expancel foaming agents, and sand. The primary fillers preferably comprise approximately 65 weight percent of the secondary coating 90, or less. This amount may be varied in exchange with the reinforcing agents and/or organic binder, and may include amounts above or below 65%. While not preferred from an economic perspective, the reinforcing agents may comprise the filler material. The reinforcing agents, in fibrous form, include wollastonite, wood fibers, cellulose, or lignin. Additional fibrous reinforcing agents may include glass fibers (including microfibers or flakes), other naturally occurring minerals with fibrous characteristics for example, gypsum (Satin Spar variety), Chalcedony (quartz), or acicular man made fibers, including metallic wools such as steel wool. Similarly plate-like materials, such as mica flakes, can be used as reinforcing agents.

The coated facing material 103 then enters a float drier 105 to remove excess liquid and allow the applied binder to form a film to hold all of the additives in place. The float drier 105 preferably has an operating temperature of about 400-550 degrees Fahrenheit depending upon the choice of resin material and oven length.

Next, the facing material 103 is optionally inspected for defects using a defect detection device 107 and wound onto a roll 109 for storage and shipment. The gypsum facing material 103 is then available to be formed into smaller rolls through a rewinding operation or slit in-line to create the finished product directly.

In an alternative preferred embodiment, as shown in FIG. 2A, a permeable precursor mat 152 may be formed in place of the permeable precursor mat 88 formed in FIG. 1. This new mat 152 is formed by introducing a low basis secondary veil 160 (see FIG. 3) to a previously formed random filament network 14 to form the mat 152. The mat 152 may be further processed to form a new, breathable, softer, partially flame retardant, sufficiently strong (meets or exceeds ASTM standards) gypsum board.

The process for forming the mat 152 is substantially similar to that described in forming the precursor mat 88 described above in FIG. 1. However, as best shown in FIG. 3, a second headbox 184 is added after the single headbox former 82 of FIG. 1 to introduce a low basis secondary veil 160.

Figure 3:
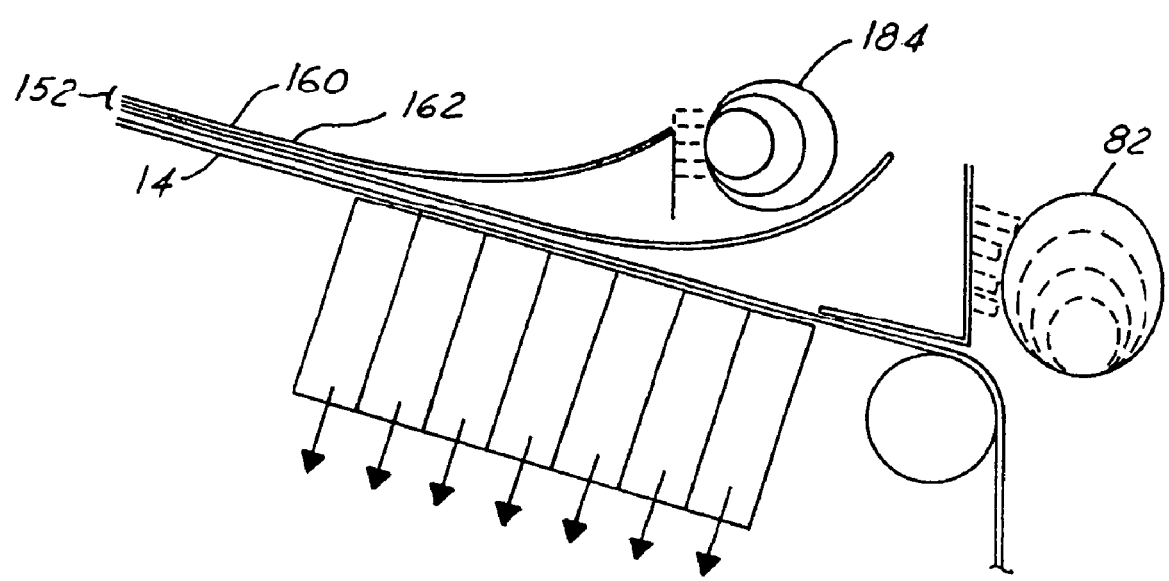
FIG. 3 is a close-up view of a dual headbox former of FIG. 2 used to replace the single headbox former of FIG. 1.

Referring now to FIGS. 2A and 3, the first headbox 82 lays down an open mat structure 14 as shown in FIG. 1. The second headbox 184 lays a low basis secondary veil 160 onto the open mat structure 14 to form the new precursor matting 152. Ideally, the second headbox 184 is capable of being rotated outwardly to allow the production of precursor matting 88 or precursor matting 152 as desired.

The low basis secondary veil 160 is preferably made of polymeric fibers 162 such as polyester fibers, flame retardant polyesters fibers, polyolefin fibers, and other polymeric fibers that can provide a soft feel. The length of the secondary fibers 162 must be sufficient to bridge the pores of the initial network 14 to insure that a layered effect is obtained. The fibers 162 are formed into an independent whitewater chemical dispersion having ingredients similar to slurry 71 described above in FIG. 3.

The precursor matting 152 is partially dried over a suction box 94 to exhibit correct release characteristics from the former wire 96 to the saturator section 98. Preferably, the matting 152 is guided from the former 82 to the saturator section 98 through a transfer device.

Upon entering the saturator section 98, the matting 152 is further dried with a first suction box 100. A binder 16 is then poured onto the matting 152 from a curtain coater 102 or similar depositing device. The binder 16 coats and is pulled through the network 14 using a second suction box 104. An additional suction box 106 is employed to control the binder basis weight. A secondary curtain coater introducing a second portion of the binder 16 may be added if specific surface chemical effects are desired. Ideally, binder basis weight level is measured at the end of the line 17 using a binder basis-gauging device 108 or prior to any additional coating steps. The coated matting 152 is subsequently dried and cured in a dryer 110 such as a through-air dryer or honeycomb dryer to form a wet formed permeable precursor mat 153, or facing material 153. Next, the facing material 153 is optionally inspected for defects using a defect detection device 107 and wound onto a roll 109 for storage and shipment. The gypsum facing material 153 is then available to be formed into smaller rolls through a rewinding operation or slit in-line to create the finished product directly.

Alternatively, as shown in FIG. 2B, the finished precursor mat 153 could be either coated off-line or in-line to form a gypsum facing material 156. If in-line coating is utilized, as shown further in FIG. 2B, a secondary coating 90 from a storage tank 97 coupled to a feed tank 99 is applied to the precursor mat 153 using a coating device 93. The coated facing material 153 then enters a float drier 105 to remove excess liquid and allow the applied binder to form a film to hold all of the additives in place. The float drier 105 preferably has an operating temperature of about 400-550 degrees Fahrenheit depending upon the choice of resin material and oven length. Next, the facing material 156 is optionally inspected for defects using a defect detection device 107, measured at the end of the line using a binder basis-gauging device 108, and wound onto a roll 109 for storage and shipment. The gypsum facing material 156 is then available to be formed into smaller rolls through a rewinding operation or slit in-line to create the finished product directly.

If an off-line coating is preferred (not shown), for instance wherein the coating 90 is added at a customer site, the precursor mat 156 is simply wound onto a roll for storage and shipment as described above in FIG. 2A.

In another alternative preferred embodiment, as shown in FIG. 4A, a softer feeling gypsum board may also be formed utilizing a precursor mat 213 that is formed wherein high aspect ratio (L/D) particles 205 are introduced during the process of FIG. 1 to form the precursor matting 213. High aspect ratio particles 205 act in a similar manner to the secondary fibers 162 of FIGS. 2A and 2B, and FIG. 3, in that they will not venture substantially into the pores of the prelaid network 14. For the purposes of this invention, such high aspect ratio particles include plate-like particles, such as mica, as described above. Further, the use of high aspect ratio particles 205 offer manufacturing advantages because the forming equipment can be readily removed from the processing line during normal veil manufacturing operations. Examples of high aspect ratio particles 205 that may be introduced to the present invention include mica, glass fibers (if a thick, subsequent coating is employed), wood-based fibers, and polymeric fibers.

Referring now to FIG. 4A, the process for forming the new precursor mat 203 is similar to the formation of the precursor mat 88 of FIG. 1. However, a plurality of fibrous/plate like particles 205 are evenly dispersed onto the network 14 from a brushy roller system 209 either prior to a single binder application or between the second suction box 104 and third suction box 106 prior to introduction of the binder 16. The plate like particles 205 are sized (i.e. have an average particle size) such that they do not venture into the pores defined within and between the strands 18 forming the fibrous network 14.

A second low viscosity binder 216 may be introduced onto the high aspect ratio particles 205 using a similar application device 202 as that described above with reference to FIG. 1, thereby locking the particles 205 in place within the resin 16 and mat 203. The secondary binder 216 offers surface functionality under low application rates and has a chemical composition similar to that of the secondary coating 90 of FIGS. 1 and 2B without additives (fillers and reinforcing materials). As above in FIG. 1, the third suction box 106 may be employed to control the binder basis weight of the coated precursor mat 203. The coated matting 203 is subsequently dried and cured in a dryer 110 such as a through-air dryer or honeycomb dryer as in FIG. 1 to form a wet formed permeable precursor mat 213, or facing material 213. Next, the facing material 213 is optionally inspected for defects using a defect detection device 107, measured at the end of the line using a binder basis-gauging device 108, and wound onto a roll 109 for storage and shipment. The gypsum facing material 213 is then available to be formed into smaller rolls through a rewinding operation or slit in-line to create the finished product directly.

Although not shown here, in a further alternative embodiment, a device similar to the brushy roller system may be used to apply the particles 205 to the newly formed network 14 prior to the addition of the binder 16, as shown in FIG. 1. In this manner, the particles 205 are deposited on top of the network 14 and bound with the binder 16. Alternatively, such a brushy roller, or other device, may be used to apply additional fibers to form a second veil layer on top of the network 14 prior to the application of the binder 16. Such devices may be placed in a manner similar to the second headbox 184 shown in FIG. 2.

Alternatively, as shown in FIG. 4B, the finished precursor mat 213 could be either coated off-line or in-line with a secondary coating 90 to form a gypsum facing material 226. If in-line coating is utilized, as shown further in FIG. 4B, the secondary coating 90 from a storage tank 97 coupled to a feed tank 99 is applied to the precursor mat 213 using a coating device 93. The coated facing material 203 then enters a float drier 105 to remove excess liquid and allow the applied binder to form a film to hold all of the additives in place. The float drier 105 preferably has an operating temperature of about 400-550 degrees Fahrenheit depending upon the choice of resin material and oven length. Next, the facing material 226 is optionally inspected for defects using a defect detection device 107, measured at the end of the line using a binder basis-gauging device 108, and wound onto a roll 109 for storage and shipment. The gypsum facing material 226 is then available to be formed into smaller rolls through a rewinding operation or slit in-line to create the finished product directly.

If an off-line coating is preferred (not shown), for instance wherein the coating 90 is added at another site, the precursor mat 213 is simply wound onto a roll for storage and shipment as described above in FIG. 4A. If the off-site coating operation has the capability of applying two coatings to the veil, it is possible to employ a fibrous/binder system in the first coating application followed by a secondary coating. Such a second coating may have additional properties, or could employ the coating formulation already described. In one embodiment, such a second coating provides for a substantially smooth surface on the coated side of the facer.

The fiber side of the single side coated, facing material 103, 153, 156, 213, and 226, respectively, is combined with a gypsum core to form a gypsum board. An example of a process and gypsum formulations are provided in U.S. Pat. No. 4,647,496, which is incorporated herein by reference. The fibrous mat-faced gypsum board of the present invention comprises a set gypsum core that is basically the type of core used in those gypsum structural products that are known as gypsum wallboard, drywall, gypsum board, gypsum lath, and gypsum sheathing. The core of such a product is formed by mixing water with powdered anhydrous calcium sulfate or calcium sulfate hemihydrate ($CaSO_4.1/2H_2O$), also known as calcined gypsum, and thereafter allowing the mixture (in slurry form) to hydrate or set into calcium sulfate dihydrate ($CaSO_4.2H_2O$), a relatively hard material. The core of the product will in general comprise at least about 85 weight percent of set gypsum.

The composition from which the set gypsum core is made can include optional constituents, including, for example, those included conventionally in fire-resistant gypsum board and in water-resistant gypsum board. Examples of such constituents include set accelerators, retarders, foaming agents, dispersing agents, water-resistant additives and fire-resistant additives. These formulations are known to one skilled in the art, and are not described in detail herein.

In conventional fashion, dry ingredients from which the gypsum core is formed are pre-mixed and then fed to a known mixer of the type commonly referred to as a pin mixer. Water and other liquid constituents used in making the core are metered into the pin mixer where they are combined with the dry ingredients to form an aqueous gypsum slurry. Foam is generally added to the slurry in the pin mixer to control the density of the resulting core. The slurry is dispersed through one or more outlets at the bottom of the mixer onto a moving sheet of the wet permeable mat that is indefinite in length and is fed from a roll thereof. The mat forms one of the facing sheets of the board.

A second sheet of fibrous mat 103, 153, 156 213, 226 is fed from a roll onto the top of the slurry, thereby sandwiching the slurry between the two moving sheets that form the facings of the set gypsum core that is formed from the slurry. Conventional shaping rolls and edge guiding devices are used to shape and maintain the edges of the composite until the gypsum has set sufficiently to retain its shape.

The formation of the gypsum facer, and gypsum boards there from, according to the present invention runs at a high process rate and is cost effective for a high volume commodity. The secondary binder 90 is flexible in that it can be used with a wide variety of mat inputs. Further, the addition of the low basis secondary veil as in FIGS. 2A and 2B, or the fibrous/plate particles as in FIGS. 4A and 4B, aid in forming gypsum boards having sufficient mechanical strength (according to ASTM standards). The gypsum boards formed are breathable to permit gypsum penetration, and flame retardancy is achieved mostly through gypsum penetration within the facing material.

While the invention has been described in terms of preferred embodiments, it will be understood, of course, that the invention is not limited thereto since modifications may be made by those skilled in the art, particularly in light of the foregoing teachings.

What is claimed is:

1. A gypsum facing material comprising:
a randomly oriented open mesh filament network substantially impregnated with a first binder resin; and
an aqueous secondary binder resin applied to said randomly oriented open mesh filament network, said secondary binder resin having a viscosity sufficient to partially penetrate said open mesh filament network, wherein said secondary binder resin includes at least one filler, at least one fibrous reinforcing agent, and at least about 6% by weight of a fairly low glass transition organic binder,
wherein said filler is present in said secondary binder resin in an amount not more than about 65% by weight.

2. The gypsum facing material of claim 1, wherein said secondary binder resin further comprises a small level of a crosslinking agent.

3. The gypsum facing material of claim 1, wherein said secondary binder resin further comprises a small level of a thermosetting resin.

4. The gypsum facing material of claim 1, wherein said secondary binder resin further comprises a small level of a crosslinking agent and a small level of a thermosetting resin.

5. The gypsum facing material of claim 1, wherein said fairly low glass transition binder comprises between about 7 and 10 percent of the total weight of said secondary binder resin.

6. The gypsum facing material of claim 1, wherein said fairly low glass transition organic binder comprises an acrylic based resin.

7. The gypsum facing material of claim 1, wherein said fairly low glass transition organic binder comprises a styrene-butadiene-rubber based resin.

8. The gypsum facing material of claim 1, wherein said at least one filler is selected horn the group consisting of calcium carbonate, aluminum hydroxide, zinc oxide, mixed oxides, iron oxides, chromates, glass beads, silicates, clay, sand and combinations thereof.

9. The gypsum facing material of claim 1, wherein said at least one fibrous reinforcing agent is selected from the group consisting of wollastonite fibers, wood fibers, cellulose fibers, lignin fibers, polypropylene fibers, polyester fibers, glass fibers, acicular man made fibers and combinations thereof.

10. The gypsum lacing material of claim 1, further comprising a low basis secondary veil layered onto said randomly oriented open mesh filament network.

11. The gypsum facing material of claim 10, wherein said low basis secondary veil comprises a plurality of glass fibers, polymeric fibers, or a mixture thereof, said fibers having a length sufficient to bridge each of a plurality of pores defined within said randomly oriented open mesh filament network.

12. The gypsum facing material of claim 11, wherein said secondary veil comprises glass fibers, and said glass fibers are covered by a coating.

13. The gypsum facing material of claim 11, wherein said secondary veil comprises polymeric fibers, wherein said polymeric fibers are selected from the group consisting of polyester fibers, flame retardant polyester fibers, flame retardant polyolefin fibers and polyolefin fibers.

14. The gypsum facing material of claim 1, wherein said first binder resin makes a stable emulsion in water and is selected from the group consisting of a melamine-based resin, a urea-formaldehyde-based resin, an acrylic-based resin and a modifying resin.

15. The gypsum facing material of claim 1, wherein said randomly oriented open mesh filament network comprises a plurality of wet use chop strands.

16. The gypsum facing material of claim 15, wherein at least one of said plurality of wet use chop strands includes a low solids sizing composition.

17. The gypsum facing material of claim 1, farther comprising:
a plurality of high aspect ratio particles applied onto said open mesh filament network.

18. The gypsum facing material of claim 17, wherein said plurality of high aspect ratio particles is selected from the group consisting of wollastonite, wood-based fibers, polymeric fibers, cellulose, lignin, polypropylene fibers, polyester fibers, glass fibers, gypsum, Chalcedony, acicular man-made fibers, metallic wools, steel wool, mica and combinations thereof.

19. The gypsum facer material of claim 1, wherein said secondary binder resin further comprises an inorganic binder.

20. The gypsum facer material of claim 19, wherein said inorganic binder comprises a compound selected from the group consisting of calcium oxide, calcium silicate, calcium sulfate, magnesium oxychloride, magnesium oxysulfate, aluminum hydroxide and portland cement.

21. A gypsum facing material comprising:
a randomly oriented open mesh filament network substantially impregnated with a first binder resin;
a first reinforcing agent applied to said open mesh filament network, said first reinforcing agent including high aspect ratio particles;
a second binder resin to hold said high aspect ratio particles onto said open mesh filament network; and
an aqueous coating applied to said randomly oriented open mesh filament network at a viscosity sufficient to prevent full penetration of said aqueous coating within said impregnated randomly oriented open mesh filament network, wherein said aqueous coating includes at least one filler, at least one second reinforcing agent selected from the group consisting of acicular man made fibers and fibrous reinforcement agents, and a fairly low glass transition organic binder.

22. The gypsum facing material of claim 21, wherein said high aspect ratio particles ate selected from the group consisting of mica, coated glass fibers, wood-based fibers and polymeric fibers.

23. The gypsum facing material of claim 21, wherein said high aspect ratio particles do not substantially enter into pores defined by said open mesh filament network.

24. The gypsum facing material of claim 21, wherein said at least one fibrous reinforcing agent is selected from the group consisting of wollastonite fibers, wood-based fibers, polymeric fibers, cellulose fibers, lignin fibers, polypropylene fibers, polyester fibers, glass fibers, acicular man-made fibers, and combinations thereof.

25. The gypsum facing material of claim 21, wherein said first reinforcing agent is applied to said first binder resin prior to said aqueous coating.

26. The gypsum facing material of claim 21, wherein said fairly low glass transition organic binder is present in said aqueous coating in an amount of at least about 6% by weight.

27. A gypsum facing material comprising:
a randomly oriented open mesh filament network substantially impregnated with a first binder resin; and
an aqueous secondary binder resin applied to said randomly oriented open mesh filament network, said secondary binder resin having a viscosity sufficient to partially penetrate said open mesh filament network, wherein said secondary binder resin includes a fairly low glass transition organic binder, at least one filler, and at least one reinforcing agent selected horn the group consisting of acicular man made fibers and fibrous reinforcement agents, said at least one filler being present in said secondary binder resin in an amount of not more than about 65% by weight.

28. The gypsum facing material of claim 27, wherein said fairly low glass transition organic binder comprises an acrylic based resin.

29. The gypsum facing material of claim 27, wherein said fairly low glass transition organic binder comprises a styrene-butadiene-rubber based resin.

30. The gypsum facing material of claim 27, wherein said at least one filler is selected from the group consisting of calcium carbonate, aluminum hydroxide, zinc oxide, mixed oxides, iron oxides, chromates, glass beads, silicates, clay, sand and combinations thereof.

31. The gypsum facing material of claim 27, wherein said at least one reinforcing agent is selected from the group consisting of wollastonite fibers, wood fibers, cellulose, lignin, polypropylene fibers, polyester fiber, glass fibers and combinations thereof.

32. The gypsum facing material of claim 27, further comprising a low basis secondary veil layered onto said randomly oriented open mesh filament network.

33. The gypsum facing material of claim 32, wherein said low basis secondary veil comprises a plurality of glass fibers, polymeric fibers, or a mixture thereof, said fibers having a length sufficient to bridge each of a plurality of pores defined within said randomly oriented open mesh filament network.

34. The gypsum facing material of claim 27, further comprising:
a plurality of high aspect ratio particles applied onto said open mesh filament network.

35. The gypsum facing material of claim 34, wherein said plurality of high aspect ratio particles is selected from the group consisting of wollastonite, wood-based fibers, polymeric fibers, cellulose, lignin, polypropylene fibers, polyester fibers, glass fibers, gypsum, quartz, metallic wools, steel wool, mica and combinations thereof.

36. The gypsum facet material of claim 34, wherein a low viscosity binder is introduced onto said high aspect ratio particles to hold said high aspect ratio particles on said open mesh filament network.

37. The gypsum facer material of claim 36, wherein said secondary binder resin further comprises an inorganic binder.

38. The gypsum facer material of claim 37, wherein said inorganic binder comprises a compound selected from the group consisting of calcium oxide, calcium silicate, calcium sulfate, magnesium oxychloride, magnesium oxysulfate, aluminum hydroxide and Portland cement.

39. The gypsum facing material of claim 34, wherein said high aspect ratio particles do not substantially enter into pores defined by said open mesh filament network.

* * * * *